Patented May 2, 1933

1,906,402

UNITED STATES PATENT OFFICE

EDWIN B. NEWTON, OF AKRON, OHIO, ASSIGNOR TO THE B. F. GOODRICH COMPANY, OF NEW YORK, N. Y., A CORPORATION OF NEW YORK

METHOD OF VULCANIZING RUBBER

No Drawing.   Application filed February 19, 1929.   Serial No. 341,273.

This invention relates to the art of vulcanizing rubber and includes within its scope the polymerization or isomerization of rubber to hard and brittle products as well as the complex reaction taking place during the vulcanization of rubber.

It is well known that crude rubber, which is relatively soft and plastic, sensitive to temperature changes, and readily soluble in benzene, gasoline, chloroform, etc., may be vulcanized by heating in the presence of certain reagents such as sulphur, selenium, aromatic nitro compounds, etc., and is thereby rendered tough and resilient, immune to temperature changes over a considerable range, and insoluble in all ordinary solvents. Recent studies of the vulcanization of rubber indicate that the peculiar changes which result therefrom cannot be satisfactorily explained by the addition of the sulphur or other vulcanizing agent to the double bonds of the complex rubber molecule, nor by adsorption of the vulcanizing agent, nor by solid solution of the vulcanizing agent in the rubber. The theory has therefore been advanced that vulcanization is a process of polymerization or isomerization of a part or perhaps all of the rubber to a more stable form. This conclusion is borne out by the experiments which are described below.

This invention, in brief, consists in vulcanizing rubber or converting rubber to an isomeric substance by exposure to a bombardment of electrons moving with a high velocity. The electrons impinging on the rubber hydrocarbon cause a rapid vulcanization or similar modification of the rubber. It is not known whether the effect is due to the impact of the rapidly moving electrons with the molecules of the rubber hydrocarbon or to the secondary electromagnetic radiation caused by the impact. The determination of the mechanism of the change is of great theoretical importance, but has little immediate practical importance, since the vulcanizing effect has been noted only in the presence of high velocity electrons.

A stream of high velocity electrons is readily obtained from the so-called "cathode ray tube". This is a glass tube, evacuated to the highest degree possible, and containing two electrodes. One of the electrodes is capable of being strongly heated, as by the passage of an electric current, and is located opposite a "window" covered with very thin metal foil. When a high voltage is impressed on the electrodes, the heated electrode being made the cathode or negative electrode, a stream of negatively charged electrons is emitted from the cathode and repelled with an extremely high velocity in the direction of the "window", through which many of the electrons pass. The stream of electrons issuing from the "window" of the cathode ray tube penetrates for about two feet into air at atmospheric pressure, and a correspondingly shorter distance in denser media. The objects or substances which are to be treated are accordingly placed within the range of the electron stream, preferably as close as possible to the "window", in order that the maximum effect may be obtained.

As a specific example of one embodiment of the method of this invention, a sample of crude rubber was masticated thoroughly and calendered to a thin sheet. The untreated sample was very soft, weak, sticky and plastic at room temperatures and solidified to a hard, non-resilient mass at temperatures below the freezing point of water. It was readily and completely soluble in the ordinary rubber solvents, such as benzene, carbon disulphide, etc. Sheets of this rubber, after exposure in an atmosphere of nitrogen for 20 to 25 seconds, 2 inches from the "window" of a cathode ray tube operating with a current of 1 milliampere at 250,000 volts, were found to be fully vulcanized. The treated sheets of rubber exhibited the high tensile strength and elongation attainable only with vulcanized rubber. They were unaffected by low temperaturee. They swelled but did not dissolve in benzene. In short, they exhibited all the properties of vulcanized rubber.

A sample of rubber vulcanized by the method of this invention was artificially aged by exposure to an atmosphere of oxygen at a pressure of 300 pounds per square inch and a temperature of 70° C. for 144 hours. Ordinary rubber is almost completely deteriorated by this treatment, but the sample vulcanized by exposure to a stream of electrons was scarcely affected. Exposure of the rubber to the cathode rays for a longer period of time results in further polymerization, the rubber becoming hard and brittle.

It should be noted that this vulcanization has taken place in the absence of vulcanizing agents. The rubber used was a carefully washed and dried rubber, containing only small proportions of naturally occurring non-rubber constituents. Similar samples of rubber containing sulphur, accelerators, pigments, etc., vulcanize in exactly the same manner, the sulphur apparently taking no part in the vulcanization. The process is likewise operable in air, but the ozone formed by the cathode rays contributes to the rapid oxidation of the rubber, hence it is preferred to employ an atmosphere of an inert gas.

It is evident that rubber or rubber compositions are readily vulcanized or isomerized by exposure to streams of electrons of high velocity, either the so-called "cathode rays" or electron streams produced by any other convenient method. The degree of polymerization is readily controlled by changing the intensity or duration of the treatment.

It is to be understood that it is not intended to limit the scope of this invention by any theories or statements which have been advanced herein by way of explanation, but that it is limited solely by the claims appended hereto, in which I intend to claim my invention as broadly as is permissible in view of the prior art.

I claim:

1. The method of treating the rubber hydrocarbon which comprises exposing rubber to the action of high velocity electrons.

2. The method of vulcanizing rubber which comprises exposing rubber to a stream of high velocity electrons for a limited time.

3. The method of vulcanizing rubber which comprises exposing rubber for a limited time to cathode rays.

4. The method of vulcanizing rubber which comprises exposing rubber to cathode rays in the absence of chemical vulcanizing agents.

5. A modified rubber composition resulting from the treatment of rubber with high velocity electrons.

6. A vulcanized rubber composition resulting from the treatment of rubber in a stream of high velocity electrons for a limited time.

7. A vulcanized rubber composition resulting from the treatment of rubber with cathode rays for a limited time.

8. A vulcanized rubber composition free from chemical vulcanizing agents, resulting from the treatment of rubber with cathode rays for a limited time.

In witness whereof I have hereunto set my hand this 14th day of February, 1929.

EDWIN B. NEWTON.